United States Patent [19]

Gross et al.

[11] Patent Number: 5,273,420

[45] Date of Patent: Dec. 28, 1993

[54] EXTRUSION DIE FOR THERMOPLASTIC WEBS

[75] Inventors: Heinz Gross, Rossdorf; Hans Lorenz, Darmstadt; Karl Funk, Griesheim, all of Fed. Rep. of Germany

[73] Assignee: Roehm GmbH Chemische Fabrik, Darmstadt, Fed. Rep. of Germany

[21] Appl. No.: 787,933

[22] Filed: Nov. 5, 1991

[30] Foreign Application Priority Data

Nov. 5, 1990 [DE] Fed. Rep. of Germany ....... 9015187

[51] Int. Cl.$^5$ .............................................. B29C 47/16
[52] U.S. Cl. .................. 425/382.4; 425/466
[58] Field of Search ................ 425/141, 381, 384.2, 425/461, 465, 466

[56] References Cited

U.S. PATENT DOCUMENTS

| | | | |
|---|---|---|---|
| 2,938,231 | 5/1960 | Lowey, Jr. | 425/466 |
| 3,084,385 | 4/1963 | Heffelfinger | 425/466 |
| 3,096,543 | 7/1963 | Konopacke et al. | 425/466 |
| 3,125,620 | 3/1964 | Skinner | 425/466 |
| 3,694,119 | 9/1972 | Scheibling | 425/381 |
| 3,920,365 | 11/1975 | Mules | 425/461 |
| 3,940,221 | 2/1976 | Nissel | 425/466 |
| 4,055,389 | 10/1977 | Hayward | 425/381 |
| 4,372,739 | 2/1983 | Vetter et al. | 425/466 |
| 4,454,084 | 6/1984 | Smith et al. | 425/141 |
| 4,507,073 | 3/1985 | Shelton | 425/466 |
| 4,514,348 | 4/1985 | Iguchi et al. | 425/466 |
| 4,753,587 | 6/1988 | Djordjevic et al. | 425/466 |
| 4,854,844 | 8/1989 | Carlsen | 425/466 |
| 4,990,079 | 2/1991 | Lorenz | 425/141 |

FOREIGN PATENT DOCUMENTS

| | | |
|---|---|---|
| 0040672 | 12/1981 | European Pat. Off. . |
| 0367022 | 5/1990 | European Pat. Off. . |
| 0390578 | 10/1990 | European Pat. Off. . |
| 1125146 | 3/1962 | Fed. Rep. of Germany ... 425/382.4 |
| 1202973 | 10/1965 | Fed. Rep. of Germany . |
| 60-97825 | 5/1985 | Japan .................. 425/466 |
| 6805041 | 4/1969 | Netherlands . |

*Primary Examiner*—Jay H. Woo
*Assistant Examiner*—James P. Mackey
*Attorney, Agent, or Firm*—Oblon, Spivak, McClelland, Maier & Neustadt

[57] ABSTRACT

A flat web of sizable thickness made of thermoplastic can be extruded from an extrusion die without a restrictor bar if a thickness D of a restricting passage is made smaller than a shaping distance A of die lips (4, 5), and if at least one wall of the restricting passage (6) is adjustably designed as an elastic lip (7) by adjusting elements (8), so that thickness D and distance A can be changed at the same time by actuating the adjusting elements.

5 Claims, 1 Drawing Sheet

EXTRUSION DIE FOR THERMOPLASTIC WEBS

BACKGROUND OF THE INVENTION

1. Field of the Invention

The invention relates to an extrusion die for the production of flat webs of sizable thickness made of thermoplastic; they are also designated as flat-sheet dies.

2. Discussion of Background

For extrusion of thin sheets, flat-sheet dies without a restrictor bar but with elastic die outlet lips, so-called "flex lips," are used. By their elasticity, they allow a change in thickness of the flow channel of the thermoplastic melt from the manifold, up to the die lips, by up to about one half millimeter. For this purpose, multiple adjusting screws or thermal expansion pins, which act on the elastic lip, are used. When the thickness of the extruded sheet web is under 2 mm, an adjusting lift of one half millimeter is sufficient to regulate the flow of melt to the die lips and to compensate for possible irregularities in the transverse direction.

According to German utility model G 88 13 801, the positioning force is allowed to act on the elastic lip by multiple movably placed plates. This enables a more precise adjustment, for example for bead size adjustment on a downstream polishing roller, but the adjusting lift is on an order of magnitude which is matched to the extrusion of thin sheet webs.

For extrusion of thermoplastics into sheet webs with a thickness of more than 2 mm, flat-sheet dies with a restrictor bar are generally used. This is understood to be a bar projecting between the manifold and the die lips in the restricting passage of the die, which is placed movably in a groove and can be sunk by a suitable adjusting mechanism to different depths in the melt stream. In this way, melt streams of considerable thickness can also be controlled.

A number of drawbacks are connected with the use of a restrictor bar. It has to be produced separately and fitted tightly into the groove provided for it. The penetration of the plastic melt in the gap between the groove wall and the restrictor bar has to be prevented by sealing strips, which is only conditionally possible because of the material requirements on the sealing means which are difficult to meet. For design reasons, the restrictor bar has to be at a considerable distance from the die lips, where the melt is still under a very high pressure. Therefore it has to be very rigidly designed, so that it is only conditionally suitable for a fine control over the die width. The required positioning forces are considerable. The great pressure drop of the melt from the area of the restrictor bar up to the die lips can cause crosscurrents, by which the compensating action of the restrictor bar is partially destroyed again. Further, so-called dead points in the melt channel at the beginning and at the end of the restrictor bar are difficult to avoid. As a result, portions of the melt can be stopped and only be moved after the beginning of a thermal decomposition, so that streaks of decomposed material occur in the produced web.

SUMMARY OF THE INVENTION

Accordingly, one object of the invention is to provide a novel extrusion die for producing flat webs of sizable thickness without the drawbacks associated with the use of a restrictor bar. The object is achieved by an extrusion die, which is represented diagrammatically in a sectional view in FIG. 1. For comparisons, FIG. 2 shows a conventional flat-sheet die with restrictor bar 20.

According to the present invention, an extrusion die for use in the production of flat thermoplastic webs comprises:

an input channel for receiving a thermoplastic melt;
a manifold;
a pair of die lips forming an outlet of the extrusion die, the die lips being separated by a distance A at the outlet;
a restricting passage having a thickness D smaller than the distance A, the restricting passage being arranged between the manifold and the die lips and having a wall including an adjustably designed elastic lip; and
means for adjusting the elastic lip to simultaneously change the thickness D and the distance A.

Preferably, the distance A is two to ten times larger than the thickness D, the lips extend parallel to one another at the outlet of the extrusion die, and the extrusion die does not include a restrictor bar.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
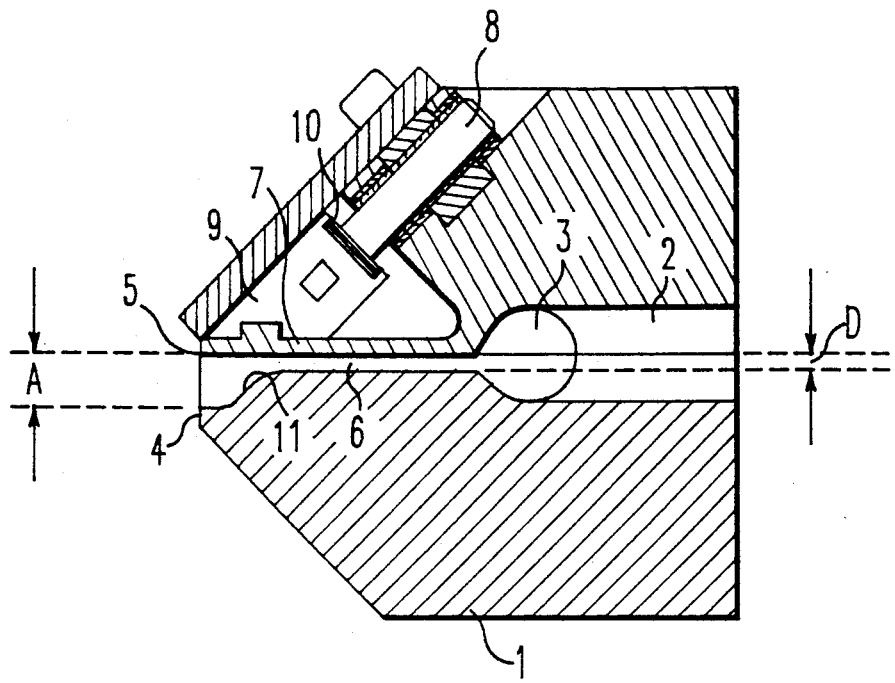
FIG. 1 diagrammatically represents a sectional view of the extrusion die of the present invention.
Figure 2:
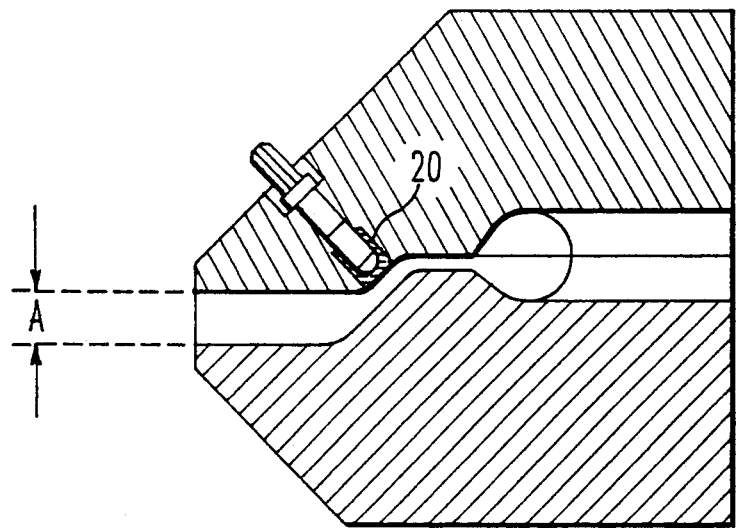
FIG. 2 shows a prior art extrusion die having a restrictor bar.

Referring now to the drawings, wherein like reference numerals designate identical or corresponding parts throughout the several views, and more particularly to FIG. 1 thereof, the present invention includes an extrusion die 1 for the production of flat webs made of thermoplastic, containing an input channel 2 for receiving the thermoplastic melt, a manifold 3, a pair of die lips 4, 5 and a restricting passage 6 placed between the manifold and the die lips. According to the invention, thickness D of the restriction passage is smaller than shaping distance A of die lips 4, 5. At least one wall of restricting passage 6 is adjustably designed as an elastic lip 7 by an adjusting means 8, so that thickness D and distance A can be changed at the same time by actuating the adjusting means.

Restricting passage 6 has a thickness D so small that the adjusting lift of elastic lip 7 is sufficient for control and fine adjustment of the melt stream. In the area of the die lips, the melt coming out of the restricting passage 6 is collected and the thickness of the extrudate increases to the desired thickness A. The speed of the extrudate decreases in inverse ratio, as the extrudate thickness increases. A restrictor bar is no longer necessary to control the melt stream and preferably is not present. As a result, all drawbacks associated with the restrictor bar are eliminated. The greater flexibility of lip 7 makes possible a much finer control of the melt stream in a narrowly limited width area than would be possible with a restrictor bar. The pressure loss after the output from restrictor area 6 is so small that crosscurrents, which could affect the uniformity of the melt stream, do not occur. This is true in particular if the distance from the downstream end of the restricting passage 6 to die lips 4, 5 is not greater than twice the distance A.

In the entire flow area of die 1, the melt flows on smooth, unperforated walls, so that it can produce neither dead points nor leaks. It is unnecessary to reroute the melt as is conventional in dies having restriction bars. As a result, the design structure of the die is simplified and the pressure loss in the melt stream is reduced.

The advantages of the new die are most effective if the ratio of A:D ranges from about 2 to about 10. Thickness D in the restrictor area is, e.g., 1 to 4 mm, preferably 1 to 2 mm, while distance A of die lips 4, 5 can be about, 3 to 40 mm or optionally even more. It is suitable to design elastic lip 7 so that it is planar up to shaping die lip 5 and to configure the transition in thickness from restricting region 6 to die lip 4 in the form of an inclined stage 11 with rounded corners to encourage a laminar flow of the melt. The angle of inclination of stage 11 from the opposite wall can be 15 to 60°. Directly in front of shaping die lip 4, the opposite walls of the flow channel are parallel to one another in the preferred embodiment of the invention. The length of the parallel output area is generally smaller than distance A of the die lips. In the extreme case, the parallel area can be totally absent, so that the output area is divergent.

The length of restrictor area 6 can range, e.g., from 10 to 100 mm. If manifold 3, as usual, is designed curved, the restrictor area begins on the end of the manifold lying nearest to lips 4, 5. The length of elastic lip 7 is dimensioned so that it allows an adjusting lift up to 0.5 mm without permanent deformation. The fine adjustment as a rule is facilitated if elastic lip 7 has a uniform thickness up to die lip 5 and the positioning force of adjusting elements 8 is introduced by movable plates 9 according to the teaching of German utility model G 88 13 801. But for special applications, a variation of the lip thickness could also be advantageous.

Adjusting elements 8, e.g., adjusting pins, thermal expansion pins or piezotranslators, preferably act on an elastic steel band 10. The closer the adjusting elements 8 are placed and the narrower the plates 9 are, the more finely adjustable the die is. Preferably, adjusting elements 8 are placed in lateral distances not over 40 mm and the plates are 1 to 5 mm thick.

After issuing from lips 4, 5, extruded extrudates up to a 15 mm thickness can be further treated on a conventional polishing roller, and the fine adjustability of the die according to the invention has an advantageous effect in controlling the bulge at the first nip. Thicker extrudates can be taken over by an endless conveyor belt and conveyed on the latter through a cooling zone.

With the extrusion die of the present invention, thermoplastics of all types, which are suitable for the production of flat webs of average to greater thickness, can be extruded. As examples, there can be mentioned PMMA, PC, PVC, PS, polyolefins, PA, PES, PEEK. The plastic melt is fed from an extruder (not shown in the drawing) into input channel 2. By using a suitable adapter in front of input channel 2, various plastics can also be coextruded to multilayer webs.

Obviously, numerous modifications and variations of the present invention are possible in light of the above teachings. It is therefore to be understood that within the scope of the appended claims, the invention may be practiced otherwise than as specifically described herein.

What is claimed is:

1. An extrusion die for use in the production of flat thermoplastic webs, comprising:
   an input channel for receiving a thermoplastic melt;
   a manifold connected to said input channel;
   a pair of die lips forming an outlet of said extrusion die, said die lips being separated by a shaping distance A of 3 to 40 mm at said outlet;
   a restricting passage having a thickness D of 1 to 4 mm, smaller than said distance A such that a ratio A:D is in a range from about 2 to about 10, said restricting passage being arranged between the manifold and the die lips and having a wall including an adjustable elastic lip, one of said die lips being connected to the adjustable elastic lip; and
   means for adjusting said elastic lip to simultaneously change the thickness D and the distance A, wherein said thickness D of the restricting passage is sized for permitting a control of a melt stream by the adjustable elastic lip;
   wherein said die lips extend parallel to one another at said outlet for forming a parallel output area, and said die lips are connected to said restricting passage by a first wall which is planar with one of said die lips and a second wall which is inclined away from said first wall and comprises rounded corners for permitting a laminar flow, said inclined second wall being connected to the other one of said die lips.

2. An extrusion die according to claim 1, wherein said parallel output area has an axial length in the direction of extrusion smaller than said distance A.

3. An extrusion die according to of claim 1, wherein said extrusion die contains no restrictor bar.

4. An extrusion die according to claim 1, wherein the distance from a downstream end of the restricting passage to said outlet is not farther than twice distance A.

5. An extrusion die for use in the production of flat thermoplastic webs, comprising:
   an input channel for receiving a thermoplastic melt;
   a manifold connected to said input channel;
   a pair of die lips forming an outlet of said extrusion die, said die lips being separated by a shaping distance A at said outlet;
   a restricting passage having a thickness D smaller than said distance A, said restricting passage being arranged between the manifold and the die lips and having a wall including an adjustable elastic lip, one of said die lips being connected to the adjustable elastic lip; and
   means for adjusting said elastic lip to simultaneously change the thickness D and the distance A;
   wherein said die lips are connected to the restricting passage by walls which diverge from one another at said outlet such that one of said walls is planar with one of said die lips and the other one of said walls is inclined away from said one wall and connected to the other one of said die lips, and said thickness D of the restricting passage is sized for permitting a control of a melt stream by the adjustable elastic lip.

* * * * *